Sept. 23, 1952  J. W. ROBINSON  2,611,490
APPARATUS FOR SEPARATING IMMISCIBLE LIQUIDS
Filed Sept. 30, 1947
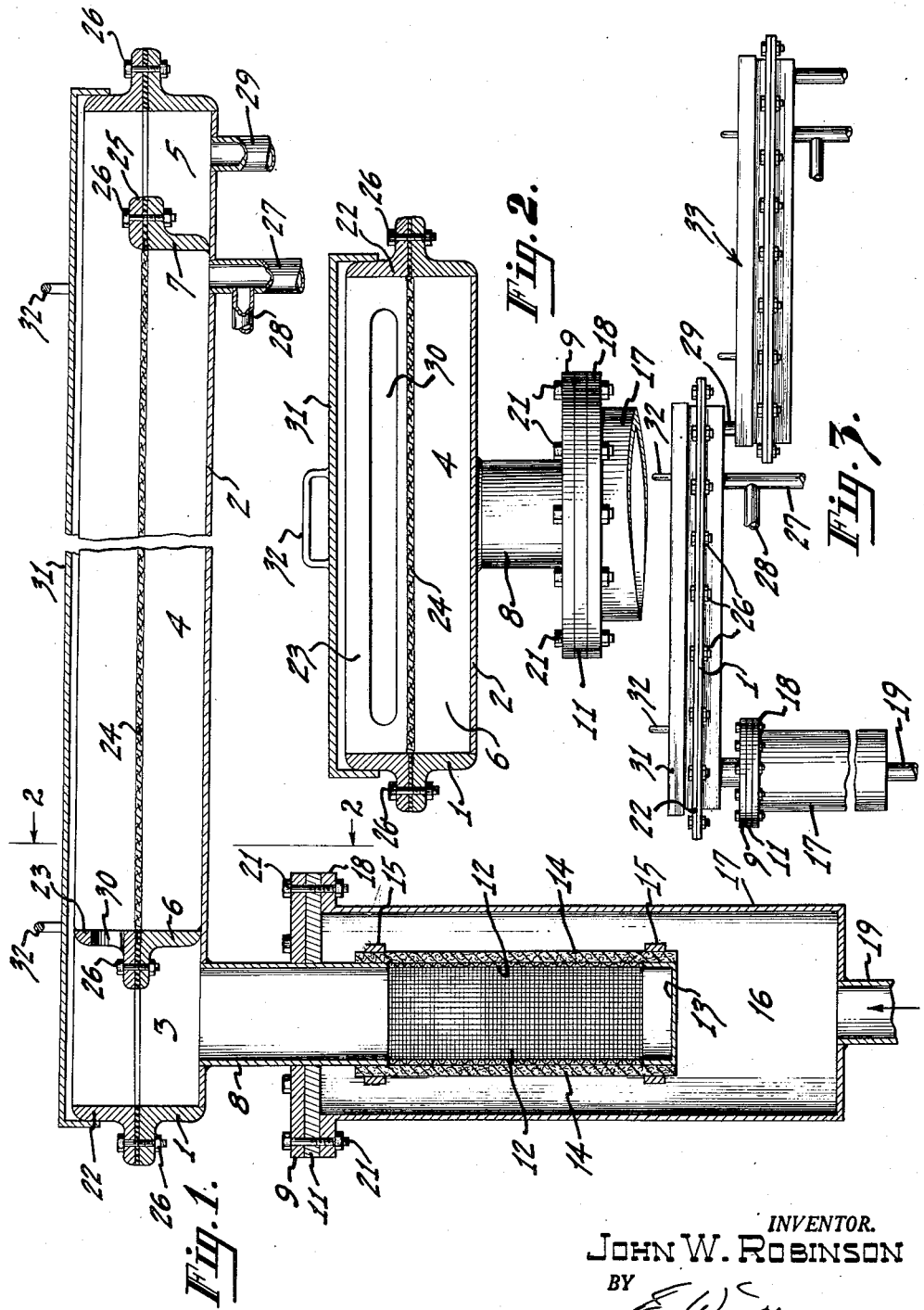
INVENTOR.
JOHN W. ROBINSON
BY
E. W. Mason
ATTORNEY Patented Sept. 23, 1952

2,611,490

UNITED STATES PATENT OFFICE 2,611,490

APPARATUS FOR SEPARATING IMMISCIBLE LIQUIDS

John Warren Robinson, Merchantville, N. J., assignor to Selas Corporation of America, Philadelphia, Pa., a corporation of Pennsylvania Application September 30, 1947, Serial No. 777,043

6 Claims. (Cl. 210—150)

The present invention relates to liquid separation apparatus and more particularly to apparatus for separating a highly dispersed mixture or emulsion of immiscible liquids whose specific gravities are substantially the same.

In many industrial processes today it is necessary to separate highly dispersed liquids in order to obtain a pure product, even when the specific gravities of the liquids are substantially the same. In the production of some hydrocarbons, for example, water becomes entrained with the product and must be separated out. With some products the specific gravity of the hydrocarbon changes from above that of water to below that of water as the process continues. In such a case it is impossible to make a separation by permitting the heavier liquid to settle. Even if this were possible the water and hydrocarbon are frequently so intimately mixed and of such close gravity that the time required for the settling operation is prohibitive.

It is an object of the invention to provide an apparatus for separating a plurality of intimately dispersed liquids whose specific gravities are substantially the same or may cross during the operation of the apparatus. It is a further object of the invention to provide an apparatus for the continuous separation of immiscible liquids which is simple in construction and easy to operate.

In the apparatus of this invention there is provided a coalescing membrane through which the emulsion to be separated is first passed. Beyond this is a second or separating membrane to finally separate the liquids. The separating membrane is treated to pass the continuous phase of the mixture and to repel the dispersed phase. This second or separating membrane is of such an area and placed at such an angle that as the coalesced mixture flows over it substantially complete separation of the liquids is obtained. In suitable cases either pressure or vacuum may be used to help produce the separation.

In particularly difficult separating problems some of the continuous phase liquid may pass over the separator with the dispersed phase liquid. In such a case, particularly if the end product is expensive, the product containing the dispersed phase liquid from the first separator may become the continuous phase liquid in a second separator used in series with the first. The second separator would then have its separating membrane treated to repel the liquid that was passed by the first.

The mixture of liquids referred to herein will be a finely dispersed mixture or emulsion of a hydrocarbon and water with water in the dispersed phase. It will be understood, however, that the emulsion to be separated could consist of any two immiscible liquids, and that the separating membrane could be treated to pass one and repel the other.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

Figure 1 is a section taken through the separating apparatus;

Figure 2 is a view taken on line 2—2 of Figure 1; and

Figure 3 is a view showing two of the separating units in series.

Referring to Figure 1 of the drawings, there is shown a rectangular frame 1 which comprises a series of structural members that have been assembled. The bottom of this frame is closed by a sheet metal plate 2 to form a tray and the tray is divided into a series of sections 3, 4 and 5 by partitions 6 and 7, respectively. Each of these parts is suitably attached together, as by welding, so that the tray is liquid tight, and the sections are separated from each other in such a manner that a liquid cannot pass from one to the other without going over the partitions. The bottom of section 3 is provided with an opening to which is attached a tubular member 8 forming an entrance passage. This member has attached to it a flange 9 that serves as a support for a pair of members forming a coalescing membrane and a receiving chamber. Next to the flange 9 is a second flange 11 that has fastened to it a cylindrical member 12 of a diameter to form a continuation of the entrance passage 8. This cylindrical member can be made of a thin piece of sheet metal or other material that has been perforated with a multiplicity of small openings, or it can be made of expanded metal or wire screen, as shown. The determining factor of the material used is that it has sufficient strength to withstand the pressure and the action of the liquid passing through it and that its surface be sufficiently smooth to support a membrane which is attached thereto without wrinkles. The tubular member 12 is provided with a closed bottom 13 so that the liquid passing through it must pass through the perforations in the walls thereof. Wrapped around the outer surface of the tubular member and covering the openings therein is a filtering and coalescing membrane 14 of any suitable type of fibrous material. This membrane can be made, for example, of glass fiber in which the intersities are very small and approach capillary size. The membrane is attached by suitable straps 15 to the exterior of the cylindrical member 12. Surrounding the coalescing membrane is a chamber 16 which is formed by a cylindrical wall 17 whose upper end is attached to a flange 18 that engages flange 11. The lower portion of this cylindrical member is provided with an opening 19 through which a mixture or emulsion of the liquids to be separated is forced. Members 12 and 17 are held in adjusted position and concentric with the entrance passage 8 by means of bolts 21 which pass through the flanges 9, 11 and 18. Such construction permits easy disassembly of the parts so that the coalescing membrane 14 may be changed when necessary.

The frame 1 and the parts attached thereto may be mounted on suitable legs or supports (not shown) so that it is located at a slight angle to the horizontal with the section 3 having the inlet or entrance passage 8 on the high end. The purpose of this mounting will be described below.

A second frame member 22 is attached by bolts 26 to the upper edges of frame 1. This frame has a portion 23 that overlies partition 6 and a clamping member 25 that overlies partition 7. Partition 23 has an elongated slot or opening 30 in it, as best shown in Figure 2. In effect, frame 22 forms a continuation of frame 1 so that there is provided a receptacle or tray having side walls and a pair of partitions that do not extend as high as the side walls.

There is provided a separating membrane 24 which is held in place to form a flat top for section 4 of the tray, this membrane is fastened on one end between partitions 23 and 6 and on its other end between clamping member 25 and partition 5. The sides of the membrane are held in place by the sides of the frame as shown in Figure 2. Suitable gasket material is also placed between the surfaces of the frames. If desired partition 6 may be made higher than partition 5 so that membrane 24 will be at a slight angle to the horizontal while the frame 1 is horizontally positioned. This is a matter of preference and is immaterial as long as membrane 24 has a slope to it.

The separating membrane in this case consists of a material which will not be affected by the liquids that are to be separated and which has in it small openings almost capillary in size. As an example, the membrane can be an inorganic fabric such as glass fabric that has been treated with a material which will repel one of the liquids that is to be separated. If the membrane is to pass a hydrocarbon and repel water, it will be treated to make it hydrophobic. If, on the other hand, the membrane is to pass water and repel the hydrocarbon, it will be treated to make it hydrophilic. Treatments to cause the membrane to pass one liquid and repel the other are known in the art. If the membrane is to pass a hydrocarbon and repel water it may be treated, for example, with silicone. If it is to pass water and repel hydrocarbon it may be treated with a finely dispersed silica.

The liquid which passes through the membrane 24 and into section 4 of the tray can leave that section through an outlet pipe 27. In some cases, it may be desirable to apply a vacuum, in order to increase the flow, and, to this end, pipe 27 is provided with a branch 28 to which a vacuum pump may be connected. The liquid which was repelled by the membrane 24 will pass over clamping member 25 and into section 5 of the tray. This liquid can pass through an outlet pipe 29 to any suitable collecting point. If it is desired, a top 31 can be made to fit around the edge of frame 22 so that the apparatus can be enclosed and thus protect it from dirt and also to prevent fumes from arising that would be objectionable to the surroundings of the apparatus. Handles 32 are placed on the top so that it can be more easily removed and replaced.

In the operation of the apparatus, a liquid, which in this case is referred to as a highly dispersed mixture or an emulsion of a hydrocarbon and water with the hydrocarbon in the continuous phase and the water in the dispersed phase, is supplied through pipe 19 to chamber 16. As this chamber is gradually filled, the liquid will pass through coalescing membrane 14 and up through passage 8 into section 3. The coalescing membrane acts in a known manner to coalesce the droplets of the dispersed phase in the emulsion and therefore, increase the size of these droplets so that they will be more readily separated in the final separating operation of the apparatus. As the flow of the liquid increases the level will gradually rise until it is sufficient to pass over a partition 26 and through opening 30 in partition 23. The coalesced liquid at this time will have droplets large enough so that they can roll down the surface of membrane 24. Since this membrane has been treated to be wetted by the hydrocarbon, this phase of the mixture will pass through the membrane and into section 4 of the tray. This passing may be helped by the vacuum which can be applied to pipe 28. The droplets of the dispersed phase will be repelled by the membrane and will tend to increase in size as they accumulate on the surface of the membrane until they have reached the size sufficiently large so that they will roll down the surface of the membrane and over the clamping member to section 5 of the tray 1. At this point the liquids will be completely separated or substantially completely separated, depending upon their gravities and the fineness of the original emulsion. In any event, the angle at which the separating membrane is placed will be sufficient so that the liquid can roll by the force of gravity across its surface. Due to the large, flat surface over which the liquid rolls, and due to the differences in pressure between section 4 and the upper part of membrane 24 as well as due to the action of gravity, the separation is completed as the liquids pass across the surface of this membrane.

In some processes, the specific gravity of the hydrocarbon upon the starting of the process is greater than that of water and as the process continues will drop until it equals that of the water and later become lighter than water. In such cases, the separation of these liquids cannot be obtained by merely passing them through a coalescing membrane and permitting the liquids to settle as has been done in previous separators. If this was the case, first one liquid would settle and then the other liquid would settle. As a result it would be extremely difficult if not impossible to collect a pure liquid of one phase or the other. Therefore, after the coalescing takes place, the liquid mixture is permitted to flow slowly across a membrane which can be wetted by one of the liquids and which will repel the other liquid. During a slow passage under the force of gravity or as the liquids roll down hill across this membrane, one of the liquids will pass the membrane and the other will continue to roll until it has reached the end thereof and into another section of the tray. Thus, there is obtained a substantially complete separation of the two liquids due to the fact that they are permitted to pass over a large enough surface of a properly treated membrane so that the specific gravities or weights of the liquids are not a determining factor in the separating process.

In some cases, and particularly where the continuous phase liquid is expensive, it may be desirable to run the liquid which passes into chamber 5 through an additional separator in order to collect the remaining portion of the original continuous phase which did not drop through the membrane 24. In this case, coalescing has been completed so that outlet pipe 29 can be connected directly to the top of a second separator 33 which is identical with the separator which has been described except that it does not have member 8 and the parts supported thereby. The liquid passing from pipe 29 will gradually fill a section 3 of separator 33 and will pass over a separating membrane 24 in that separator. In this case, however, the majority of the liquid is, for example, water so that the membrane 24 in this separator will have been treated to make it hydrophilic. Therefore the water will pass through the membrane and into a section corresponding to section 4. The hydrocarbon will not wet the membrane in this separator but will pass across the top of the separator membrane and into a section corresponding to section 5 where it will pass through an outlet pipe which may be connected with outlet pipe 27. In this case, also a vacuum may be applied to the chamber corresponding to chamber 4 in order to help the flow of water through the separating membrane.

In the above described separator, provision was made for applying a vacuum to the lower surface of the separating membrane 24 in order to help force the liquid through this membrane. If desired, however, pressure could be applied through the top to the upper surface of the membrane to force the liquid through the same. If this is done top 31 would have to be made with a pressure tight fit on frame 22.

From the above, it will be seen that I have provided a simple apparatus by means of which immiscible liquids can be separated even though their specific gravities are the same or substantially the same.

While in accordance with the provisions of the statutes, I have illustrated and described the best form of embodiment of my invention now known to me, it will be apparent to those skilled in the art that changes may be made in the form of the apparatus disclosed without departing from the spirit of my invention, as set forth in the appended claims, and that in some cases certain features of my invention may be used to advantage without a corresponding use of other features.

What is claimed is:

1. Apparatus for separating a plurality of immiscible liquids comprising a tray, a plurality of partitions to separate said tray into a plurality of sections, a membrane impervious to one of said liquids and pervious to the other, means to attach said membrane to said partitions so that an intermediate section is covered thereby, an inlet to a section adjacent said intermediate section, a coalescing membrane over said inlet, and outlets for said intermediate section and the section adjacent thereto on the side opposite the section having the inlet, whereby the mixture of liquids will be coalesced as they flow through said inlet and will be separated as they flow across said membrane.

2. In apparatus for separating a plurality of immiscible liquids, a tray, partitions dividing said tray into a plurality of sections, a membrane pervious to one of said liquids and impervious to the other, means to mount said membrane on two partitions to cover one of said sections, said tray being provided with an opening in a section adjacent the section covered by said membrane, means providing a chamber communicating with said opening, a fibrous membrane in said chamber, conduit means leading to said chamber on the side of said fibrous membrane opposite said tray, and outlet means to said section covered by said first-mentioned membrane and separate outlet means for a section beyond the section covered by said first-mentioned membrane.

3. Apparatus for separating a plurality of immiscible liquids comprising means forming a tray having partitions to divide it into end sections and an intermediate section, a membrane pervious to one liquid and impervious to the other, means to attach said membrane to said partitions to cover said intermediate section, means forming an inlet adjacent to the bottom of one end section, means forming outlets adjacent to the bottom of the intermediate section and the other end section, a coalescing membrane having a multitude of passages approaching capillary size, and means to mount said coalescing membrane across said inlet.

4. Apparatus of claim 3 including means to apply a reduced pressure to the section under said first-mentioned membrane.

5. In apparatus for separating a plurality of immiscible liquids, a stationary shallow tray, partitions dividing said tray into three sections extending from side to side thereof, said tray being positioned at a slight angle to the horizontal, a membrane pervious to one of the liquids and impervious to the other, means to attach said membrane to said tray and hold it rigidly in place above the intermediate section to form a flat top therefor, an inlet at the lower portion of the section on the high end of said tray, an outlet at the lower end of the section covered by said membrane, an outlet at the bottom of the section at the lower end of said tray, a coalescing membrane, and means to attach said coalescing membrane across said inlet.

6. In apparatus for separating a mixture consisting of a plurality of immiscible liquids, a stationary tray, means to divide said tray into a plurality of sections, means to mount said tray at a slight angle to the horizontal, a membrane pervious to one liquid and impervious to the other liquid, means to attach rigidly said membrane to said tray to cover an intermediate one of said sections, said membrane forming a flat surface at a slight angle to the horizontal, an inlet for the section that is at the highest portion of said tray, whereby as the mixture flows through said inlet and fills the section connected therewith it will flow across said membrane, the portion of the mixture not passing through said membrane going to the section beyond said intermediate section, outlets for said last-mentioned section and said intermediate section, a coalescing membrane, and means to attach said coalescing membrane across said inlet.

JOHN WARREN ROBINSON.

REFERENCES CITED

The following references are of record in the file of this patent:

UNITED STATES PATENTS

| Number | Name | Date |
| --- | --- | --- |
| 1,242,784 | Dyer et al. | Oct. 9, 1917 |
| 1,328,044 | Hills | Jan. 13, 1920 |
| 1,331,732 | Wait | Feb. 24, 1920 |
| 1,584,743 | Hensley | May 18, 1926 |
| 1,665,164 | Gard et al. | Apr. 3, 1928 |
| 1,787,577 | Hills | Jan. 6, 1931 |
| 2,149,368 | Simpson | Mar. 7, 1939 |
| 2,288,532 | Knapp | June 30, 1942 |
| 2,338,904 | Cowles | Jan. 11, 1944 |
| 2,359,386 | Reinsch | Oct. 3, 1944 |
| 2,404,872 | Walker | July 30, 1946 |
| 2,407,303 | Teale | Sept. 10, 1946 |